Figure 1:
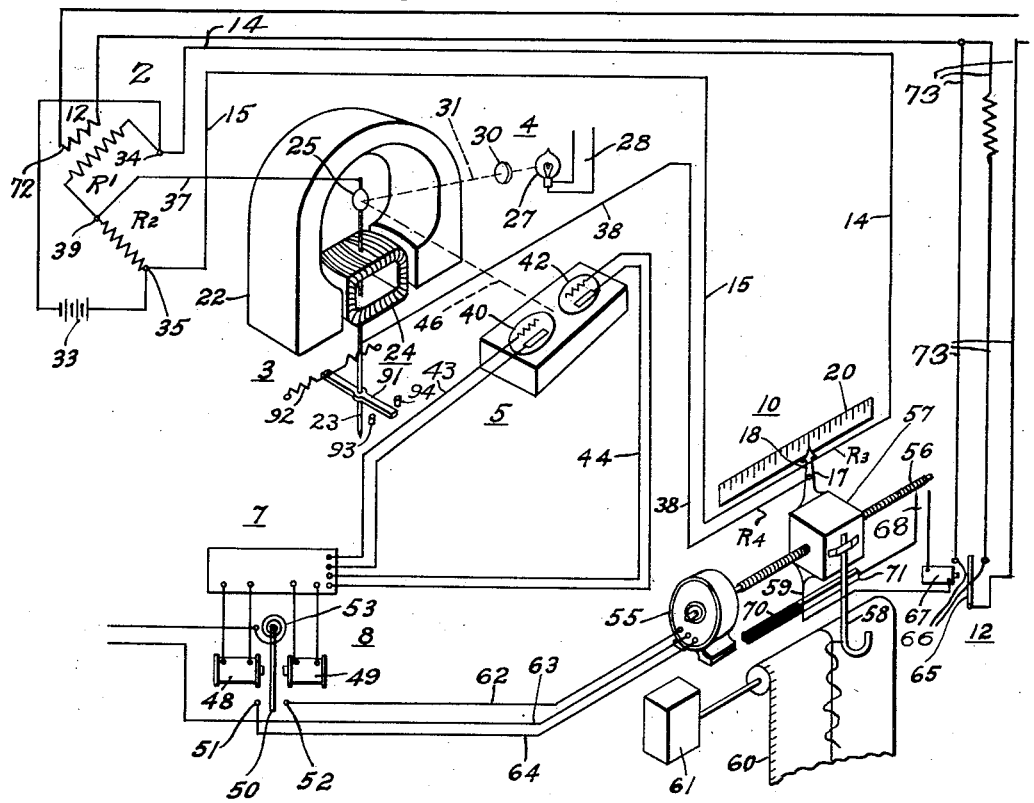

Sept. 8, 1931.  S. ARONOFF  1,822,075
ELECTRICAL MEASURING INSTRUMENT

Filed April 3, 1929

INVENTOR
Samuel Aronoff.
BY
ATTORNEY

Patented Sept. 8, 1931

1,822,075

UNITED STATES PATENT OFFICE

SAMUEL ARONOFF, OF NEWARK, NEW JERSEY, ASSIGNOR TO WESTINGHOUSE ELECTRIC & MANUFACTURING COMPANY, A CORPORATION OF PENNSYLVANIA

ELECTRICAL MEASURING INSTRUMENT

Application filed April 3, 1929. Serial No. 352,137.

My invention relates to electrical measuring instruments and particularly to instruments of the relay type.

One object of my invention is to provide an instrument, of the above indicated character, that shall be more sensitively and more accurately responsive to changes in the quantity being measured than similar instruments heretofore employed.

Another object of my invention is to provide an instrument of the relay type, embodying a Kelvin balance or similar structure, in which the balance or circuit-control contact-making-and-breaking device shall be operated by a source of energy independent of the circuit being measured, whereby inaccuracies resulting from the sticking of contact members and other causes are eliminated.

Another object of my invention is to provide a measuring instrument that shall so utilize light or other wave-sensitive elements as to free the galvanometer or other measuring device of mechanical work external to its primary function.

A further object of my invention is to provide an electrical measuring instrument or similar device that shall be simple and durable in construction, economical to manufacture and effective in its operation.

In electrical measuring instruments of the relay type, such as graphic meters employing a sliding pen carriage, a pilot motor for operating the carriage and a Kelvin-balance contact-making-and-breaking device for controlling the pilot motor, the coils of the balance which actuate the contact mechanism are usually directly traversed by currents from the circuit being measured. Thus, the torque of the balance spring is imposed against the measuring current directly, and the adverse influence of sticking contacts also tends to render the instrument somewhat inaccurate.

It is my aim to have the coil or coils which are directly traversed by the currents representing the quantities to be measured to be absolutely free of any work-imposing mechanical connection to the circuit of the pilot motor or similar device, whereby the primary measuring coil is substantially unopposed and may thereby be rendered materially more accurate and sensitive in response to changes in the quantity being measured.

Accordingly, in practicing my invention, I provide an instrument in which, instead of the movable contact member being directly connected to the movable galvanometer element, it is associated with auxiliary coils in an auxiliary circuit that includes light-sensitive elements, such as photo-electric cells. A galvanometer or similar device so controls the contacts by controlling light for actuating the light-sensitive elements as to free the galvanometer of mechanical load. Means for amplifying the proto-electric-cell circuit is also provided whereby the contact-making-and-breaking device is effectively actuated.

In order to make the invention more clearly understood, means are shown in the accompanying drawings for carrying the same into practical effect without limiting the improvements in their useful applications to the particular construction which, for the purpose of explanation, are made the subject of illustration.

Figure 2:
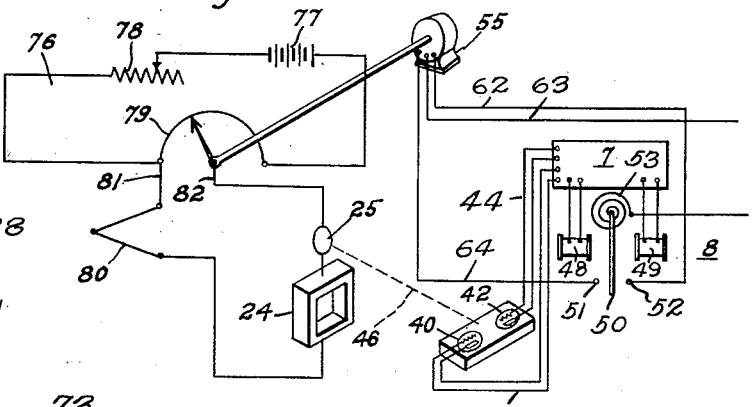
Figure 3:
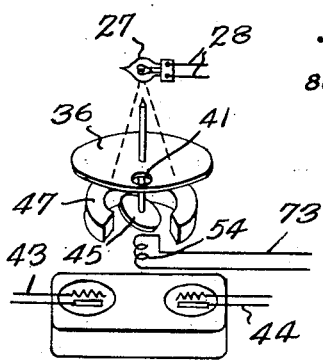

Figure 1 of the accompanying drawings is a diagrammatic view of an instrument embodying my invention, Fig. 2 is a similar view of a modified form thereof, and Fig. 3 is a diagrammatic view of a modified form of a portion of the instrument shown in Fig. 1.

Referring to Fig. 1, the device comprises, in general, a Wheatstone bridge 2, or other means affected by a quantity to be measured or controlled, a galvanometer 3 or other device, such as a Kelvin balance, a source of light 4, a light-responsive device 5, an amplifying or quantity-changing device 7, a balanced contact-making-and-breaking device 8, similar to a Kelvin balance, a combined indicating and graphic-recording instrument 10 and a switch 12 or other electro-responsive device for controlling a circuit and thereby changing a quantity controlled or affected by the circuit.

The Wheatstone bridge 2 comprises a leg $R_1$, of relatively high temperature coefficient of resistance or other characteristic, to be disposed at a position where it is subject to temperature changes or to any other variable quantity which it is desired to measure, a leg $R_2$ and legs $R_3$ and $R_4$ that are disposed in the instrument 10 and connected to the bridge 2 by conductors 14 and 15, respectively. The legs $R_3$ and $R_4$, constituting slide wires for engagement with a sliding contact member 17, are constructed as one uniform wire having a central connecting point 18 opposite a central zero point of a temperature-indicating scale 20. The bridge 2 may be constructed to respond to inductance, capacitance or other quantity instead of resistance, as illustrated by way of example.

The galvanometer 3 comprises a stationary permanent-magnet member 22, a spindle or shaft 23, a coil 24 and a mirror 25 or other light-controlling element mounted on the spindle 23. A bar member 91 is fixed to the shaft 23. One end of the bar member is secured to the midpoint of a spring 92. A pair of stop members 93 and 94 cooperate with the bar 91 to prevent overtravel of the coil 24 in either direction of rotation. The spring 92 tends to normally return the coil 24 and mirror 25 to a neutral or zero position when the coil 24 is de-energized.

The source of light 4 may comprise an ordinary incandescent lamp 27, to be energized from a circuit 28, and a lens 30 for directing a beam of light, represented by a dotted line 31, upon the mirror 25.

A battery 33 or other voltage source is connected across points 34 and 35 of the Wheatstone bridge 2 for balancing the same, and conductors 37 and 38 complete the bridge circuit from a point 39 therein, through the coil 24 of the galvanometer 3, to the sliding contact member 17.

The light-responsive device 5 preferably comprises a pair of photo-electric cells 40 and 42 that are connected by pairs of conductors 43 and 44, respectively, to the amplifying device 7.

In the above-described structure, a reflected beam of light, represented by a dotted line 46 and constituting a reflection of the beam 31 from the mirror 25, moves back and forth between the cells 40 and 42, as the mechanical arm of an ordinary Kelvin balance moves back and forth between stationary contact members.

Obviously, other elements may be substituted for the galvanometer 3 and the light-controlling element or mirror 25, and the light beam, instead of being reflected, may be directly controlled by an opening or by openings in the element 25, a shutter or other well-known device, as indicated in Fig. 3, in which an opaque disk 36 having an opening 41 therein is mounted on an ammeter spindle carrying a vane 45 that is controlled in any suitable manner, as by gravity, a spring or a permanent magnet 47 and an electromagnet 54.

The output of the cells 40 and 42 is amplified by the device 7 and conducted to actuating coils 48 and 49 of the device 8 for moving a mechanical contact arm 50 back and forth between contact members 51 and 52, accordingly as the beam of light 46 is moved back and forth between the photo-electric cells 40 and 42. The movable contact arm 50 of the device 8 is controlled by a spring 53.

The graphic recording device 10 further comprises a pilot motor 55 for operating a screw shaft 56 on which is mounted a traveling nut or carriage 57. The nut 57 carries the movable contact element 17, a pen 58 and a contact member 59.

The pen 58 cooperates with a movable chart 60 that is driven by a clock or other suitable mechanism 61 in a usual and well-known manner.

The pilot motor 55 is connected to a suitable source of energy (not shown) by the contact-making-and-breaking device 8 and conductors 62, 63 and 64.

The switch 12 comprises a movable contact arm 65, stationary contact members 66 and an actuating magnet 67, the latter being connected, by conductors 68, to a suitable source of energy, not shown.

The movable contact member 59 is adapted to slide along an elongated contact member having an insulating half portion 70 and a conducting half portion 71. The contact members 65 and 66 of the switch 12 are connected to a heat source 72 for heating the resistor $R_1$ of the bridge 2 by conductors 73.

In operation, when a change of temperature occurs, causing rise or fall of the temperature of the leg $R_1$, the Wheatstone bridge 2 is unbalanced, thereby causing deflection of the coil 24 of the galvanometer 3 and causing the light beam 46 to impinge against the one or the other of the photo-electric cells 40 and 42. This action energizes the one or the other of the pairs of conductors 43 and 44 and, consequently, actuates one of the magnet coils 48 and 49 to move the contact arm 50 into engagement with the one or the other of the stationary contact members 51 and 52. This action energizes the pilot motor 55 to operate in the one or the other direction to move the nut 57 forwardly or backwardly along the screw shaft 56. Thus, the resistance of one of the slide-wire resistance legs $R_3$ and $R_4$ is changed to again balance the Wheatstone bridge, and the new temperature is indicated by the pointer 17 on the scale 20 and graphically recorded on the chart 60 by the pen 58. Also, movement of the nut 57, as above described, causes the contact member 59 to engage the insulating element 70 or the conducting element 71 to, respectively, de-energize or energize the magnet coil 67 of the switch 12. The latter action causes the movable contact member 65 to engage one of the stationary contact members 66 to decrease or increase the temperature to which the resistor leg $R_1$ is responsive.

In the above described structure, since the current representing the quantity being measured traverses the galvanometer coil 24 and the latter is substantially unopposed in its movement, the device is quickly, accurately and sensitively responsive to changes in the quantity being measured and free from the inaccuracies sometimes caused by sticking of the contact members, the opposition of a control spring and other factors associated with a mechanically-operated switch.

In the form of my invention illustrated in Fig. 2, in which corresponding parts are indicated by corresponding reference characters, the structure is substantially the same as that above described, with the exception that, instead of utilizing a Wheatstone bridge, a potentiometer circuit 76 is employed.

The circuit 76 comprises a source of energy 77, a variable resistor 78 and a slide-wire resistor 79 connected in series relation. A thermo-couple 80 is connected, between points 81 and 82, in the potentiometer circuit 76 through the galvanometer coil 24. Obviously, a photoelectric cell or other device may be substituted for the thermo-couple 80 to render the instrument responsive to daylight intensity or other illumination or quantity.

In this form of my invention, when the potentiometer circuit 76 is unbalanced, the coil 24 deflects, thus directing the light beam 46 toward the one or the other of the photo-electric cells 40 and 42 to again balance the circuit, as in the above described structure.

While I have shown and described particular forms of my invention, changes may be effected therein without departing from the spirit and scope thereof as set forth in the appended claims.

I claim as my invention:—

1. In combination, an electro-responsive device operative in opposite directions, and means for causing said device to operate in said directions, including light-responsive means, and means automatically operative in opposite directions in response to variations in a quantity for controlling the light beams for actuating the light-responsive means.

2. In combination, a circuit including means operative in accordance with balance and unbalance of the voltage between points in the circuit, light-responsive means, and means controlled by said first means for controlling light beams to affect said light-responsive means.

3. In combination, means for changing a measurable quantity, electro-responsive actuating means therefor, light-responsive means for controlling said actuating means, and means responsive to changes in said quantity for controlling the actuating light beams for said light-responsive means.

4. In combination, a member movable in reverse directions, electro-responsive means for moving said member, means for reversing the current of the circuit of said means, a pair of light-responsive elements for controlling said reversing means, a source of light, and means for directing light from said source to actuate said elements.

5. In combination, a member movable in opposite directions, electro-responsive means for moving said member, an electromagnetic switch for reversing the current of the circuit of said means, a pair of photo-electric cells for controlling the operation of said switch, amplifying means between the cell and switch circuits, a source of light, and means for directing light from said source to actuate said cells.

In testimony whereof, I have hereunto subscribed my name this 9th day of March, 1929.

SAMUEL ARONOFF.